(12) United States Patent  
White et al.

(10) Patent No.: US 6,500,581 B2
(45) Date of Patent: *Dec. 31, 2002

(54) BATTERY PACK

(75) Inventors: Paul S. White, Ellicott City, MD (US); Mary Elizabeth Larkin, Perry Hall, MD (US); Michael J. Agnes, Bel Air, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/960,551

(22) Filed: Sep. 21, 2001

(65) Prior Publication Data

US 2002/0012832 A1 Jan. 31, 2002

Related U.S. Application Data

(63) Continuation of application No. 09/354,405, filed on Jul. 15, 1999, now Pat. No. 6,326,101.

(51) Int. Cl.[7] ................................................ H01M 2/10
(52) U.S. Cl. ........................................ 429/99; 429/100
(58) Field of Search .............................. 429/99, 100, 97

(56) References Cited

U.S. PATENT DOCUMENTS 5,213,913 A * 5/1993 Anthony, III et al. ......... 429/97
6,007,939 A * 12/1999 Clowers ....................... 429/99

* cited by examiner

Primary Examiner—John S. Maples
(74) Attorney, Agent, or Firm—Adan Ayala

(57) ABSTRACT

In accordance with the present invention, an improved battery pack is employed. The battery pack includes a housing with opposing walls, a plurality of cells disposed within the housing, at least two terminals electrically connected to the cells, a latching mechanism disposed on each opposing wall for latching the battery pack to a cordless device, each latching mechanism including a latch and a button disposed on the wall for moving the latch between unlatching and latching positions, the latching buttons being disposed along a first plane, the first plane being substantially vertical, wherein the number of cells disposed along the first plane is smaller than the number of cells disposed along a second plane substantially parallel to the first plane. The battery pack may also include a stacked cell disposed on the plurality of cells. The stacked cell may be disposed along the first plane. However, the stacked cell is not included in the number of cells disposed along the first plane.

31 Claims, 3 Drawing Sheets

BATTERY PACK

This application is a continuation of Ser. No. 09/354,405, filed Jul. 15, 1999, now U.S. Pat. No. 6,326,101.

FIELD OF THE INVENTION

This invention relates generally to battery packs and, more particularly, to battery packs for cordless power tools.

BACKGROUND OF THE INVENTION

Cordless products which use rechargeable batteries are prevalent throughout the workplace as well as in the home. From housewares to power tools, rechargeable batteries are used in numerous devices. Ordinarily, nickel-cadmium or nickel-metal hydride battery cells are used in these devices. Since the devices use a plurality of battery cells, the battery cells are ordinarily packaged as battery packs. These battery packs couple with the cordless devices and secure to the device. The battery pack may be removed from the cordless device and charged in a battery charger or charged in the cordless device itself.

FIGS. 1–3 illustrate a typical battery pack 10, which includes a bottom housing 11, a plurality of cells 12 disposed within the housing, a cell 13 disposed on the plurality of cells 12, and a terminal block 14 disposed on cell 13. Persons skilled in the art will recognize that the terminal block 14 and cells 12, 13 are electrically connected in a manner well known in the art, and that such electrical connections are not shown for the sake of clarity. Also, persons skilled in the art are referred to U.S. Pat. No. 5,144,217 for further information on a typical prior art terminal block 14.

A pack cover 15 carrying a tower 16 is disposed on housing 11 so as to contain cells 12, 13 therein. Tower 16 has an aperture 17 exposing terminal block 14 for electrical connection to the power tool (not shown). The pack cover 15 may be held in place via screws 19, or other means, so as adhesives, molten plastic, etc.

Typical battery packs include at least one latch mechanism 18 for latching the battery pack 10 to the power tool, or cordless device. Latch mechanism 18 typically includes a button 18B disposed on housing 11, a latch hook 18L movably connected to button 18B and movable between a latching position and an unlatched position, and a spring 18S for biasing latch hook 18L towards the latching position. Accordingly, in order to unlatch a battery pack from the power tool, the user needs to press button(s) 18B with one hand, moving latch hook 18L towards the unlatched position, and pull out the battery pack 10, while holding the power tool with the other hand.

Typically battery packs 10 have two buttons 18B on opposing walls of housing 11. Accordingly, the operator needs to bridge the composite distance of A, B and C, i.e., the lengths along the housing 11, in order to press both buttons 18B and unlatch battery pack 10. However, as the number of cells 12 is increased to obtain higher voltages, the composite distance (A+B+C) is also increased, until the operator cannot easily reach both buttons 18B.

SUMMARY OF THE INVENTION

In accordance with the present invention, an improved battery pack is employed. The battery pack includes a housing with opposing walls, a plurality of cells disposed within the housing, at least two terminals electrically connected to the cells, a latching mechanism disposed on each opposing wall for latching the battery pack to a cordless device, each latching mechanism including a latch and a button disposed on the wall for moving the latch between unlatching and latching positions, the latching buttons being disposed along a first plane, the first plane being substantially vertical, wherein the number of cells disposed along the first plane is smaller than the number of cells disposed along a second plane substantially parallel to the first plane. The battery pack may also include a stacked cell disposed on the plurality of cells. The stacked cell may be disposed along the first plane. However, the stacked cell is not included in the number of cells disposed along the first plane.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which.

DETAILED DESCRIPTION

Figure 1:
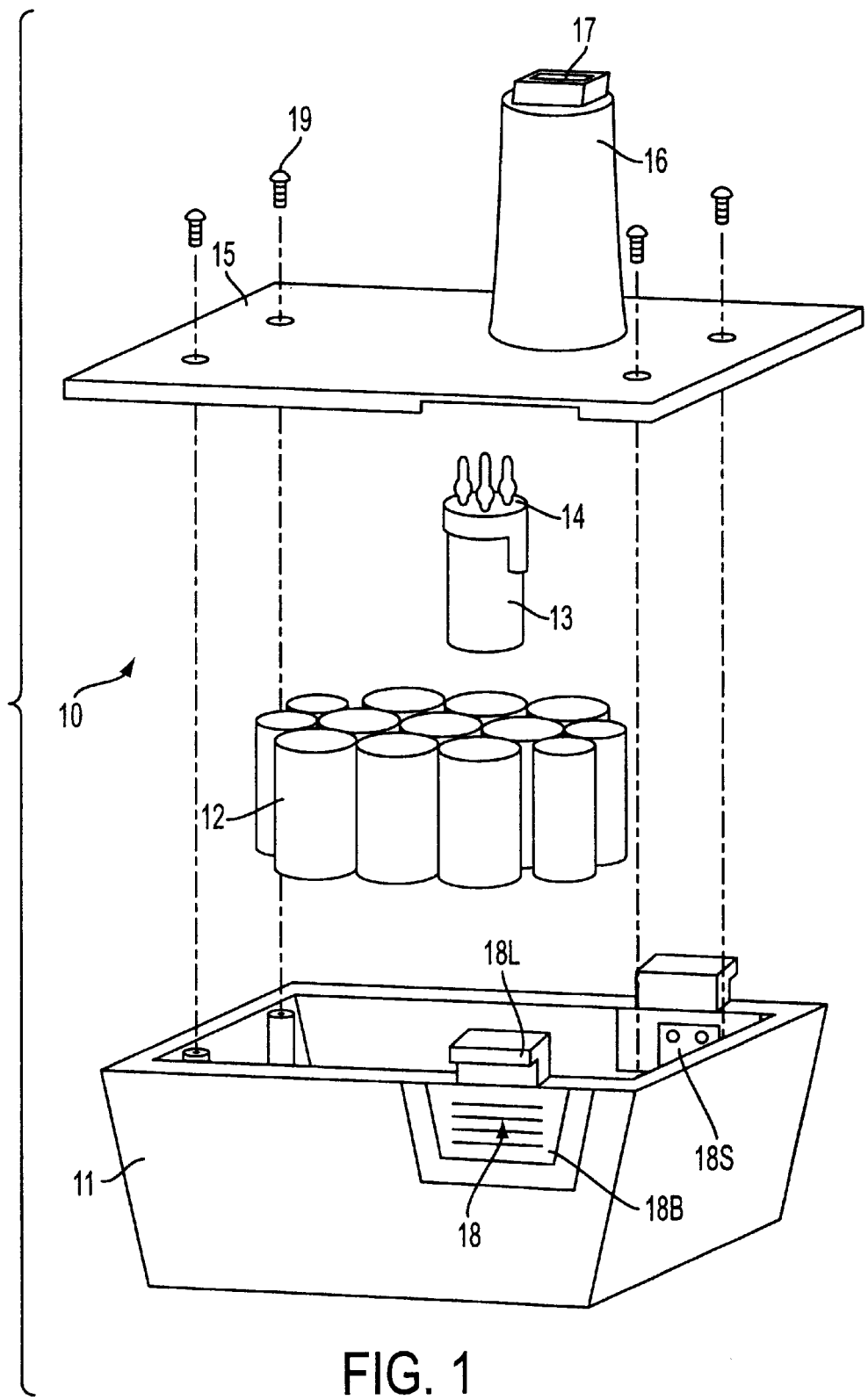
FIG. 1 is an exploded perspective view of a prior art battery pack.
Figure 2:
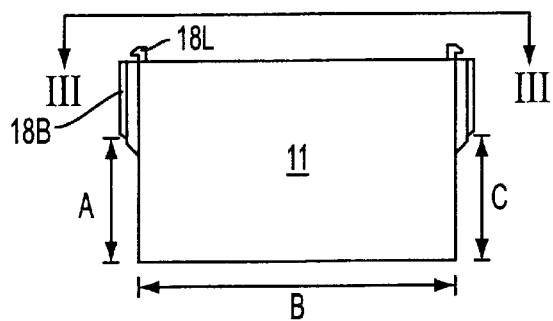
FIG. 2 is a rear view of the lower portion of the battery pack of FIG. 1.
Figure 3:
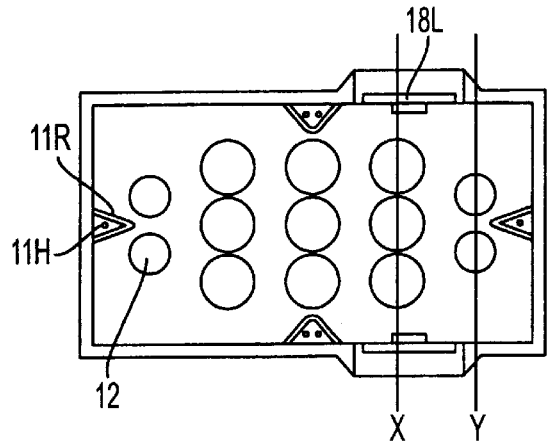
FIG. 3 is a top plan view of the lower portion of FIG. 2 along line III—III.
Figure 4:
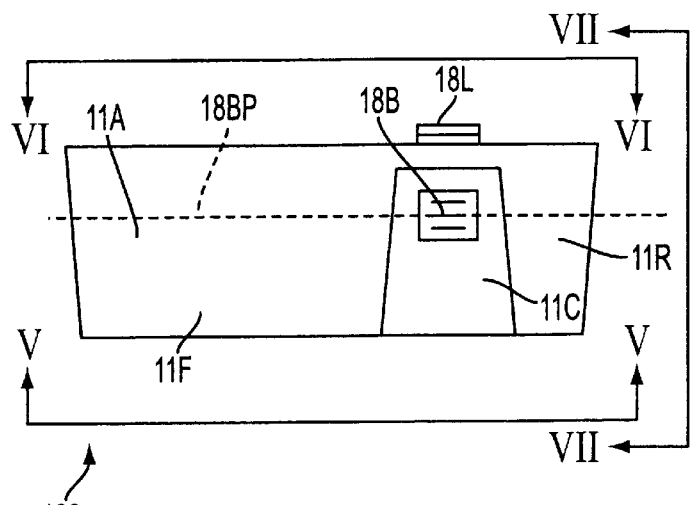
FIG. 4 is a side view of a lower portion of the improved battery pack according to a first embodiment of the present invention.
Figure 5:
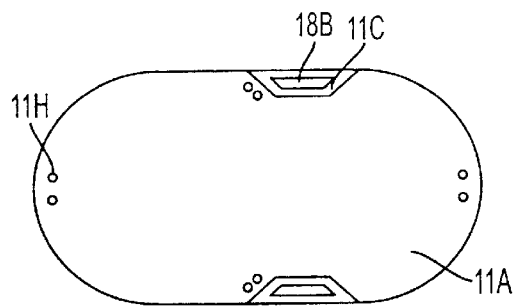
FIG. 5 is a bottom plan view of the lower portion of FIG. 4 along line V—V.
Figure 6:
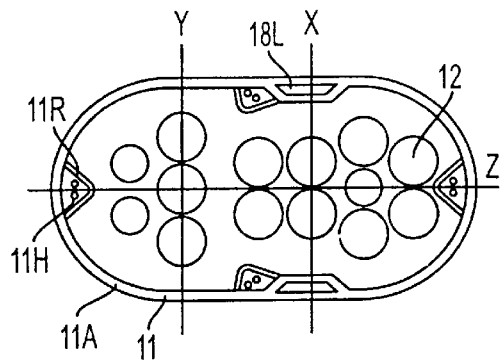
FIG. 6 is a top plan view of the lower portion of FIG. 4 along line VI—VI.
Figure 7:
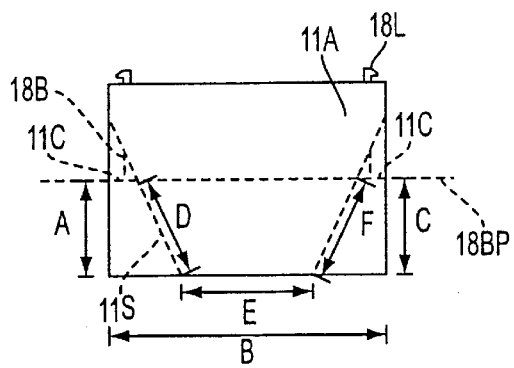
FIG. 7 is a rear elevational view of the lower portion of FIG. 4 along line VII—VII.

The invention is now described with reference to the accompanying figures, wherein like numerals designate like parts. Referring to FIGS. 4–7, the battery pack 100 has a housing 11A, latch mechanisms 18 thereon, and cells 12 within housing 11A. Battery pack 100 may also have a pack cover 15, tower 16, terminal block 14 and/or cell 13 as taught in the prior art.

Preferably each of two opposing walls of housing 11A has a front portion 11F, a rear portion 11R and a channel portion 11C disposed between front and rear portions 11F, 11R. Preferably channel portion 11C is depressed relative to front and rear portions 11F, 11R. In other words, while front and rear portions 11F, 11R may be substantially coplanar, channel portion 11C is not.

Channel portion 11C may include a surface 11S. Preferably the distance between surface 11S and center plane Z is smaller than the distance between center plane Z and front and/or rear portions 11F, 11R. Surface 11S may be inclined or substantially parallel to front and/or rear portions 11F, 11R (though not coplanar).

Persons skilled in the art will recognize that button 18B may be disposed on surface 11S or within channel portion 11C. However, persons skilled in the art should recognize that buttons 18B may be disposed outside of channel portion 11C.

By providing such channel portions 11C, the effective distance between latch buttons 18B, i.e, the composite distance, is about D+E+F, and thus is smaller than composite distance A+B+C, thus providing a more ergonomic access to the latching buttons 18B. Preferable, distance D+E+F is about or less than 4 inches, whereas the distance A+B+C is about 4.5 inches.

In order to obtain such arrangement, it is preferable to arrange cells 12 so that the number of cells 12 disposed between the latching buttons 18, or along plane X, is smaller than the number of cells 12 disposed elsewhere in housing Y, e.g., along plane Y. Such cell arrangement permits the surface 11S to be closer to the center plane Z.

Figure 8:
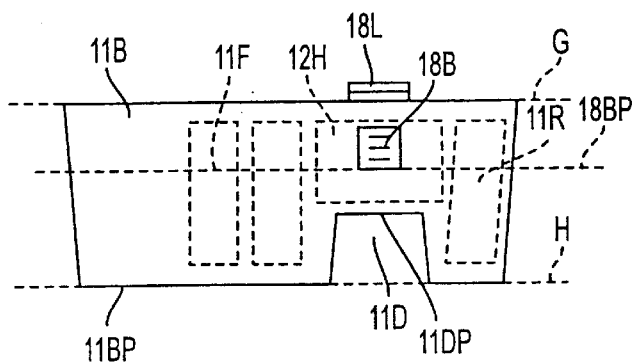
FIG. 8 is a side view of a lower portion of the improved battery pack according to a second embodiment of the present invention.

A second embodiment is shown in FIG. 8, where like numerals refer to like parts. The teachings of the first embodiment are incorporated herein. Housing 11B, as before, may carry latching buttons 18B, and may have front and rear portions 11F, 11R. Housing 11B may also have a bottom surface 11BP, which is substantially planar along plane H. A channel portion 11D is preferably disposed between front and rear portions 11F, 11R, and/or below latching buttons 18B. Preferably, channel portion 11D has a surface 11DP which is disposed between buttons 18B and plane H. In other words, the distance between surface 11DP and buttons 18B is smaller than the distance between buttons 18B and plane H. Similarly, the distance between surface 11DP and top housing plane G is smaller than the distance between planes G and H, i.e., the height of housing 11.

In order to obtain such arrangement, it is preferable to arrange at least one of the cells 12 (cell 12H) so that it lays horizontally, as opposed to the other cells 12 which stand vertically, in housing 11. Such cell arrangement permits the surface 11DP to be closer to the buttons 18B, etc.

Housing 11 may also have vent holes 11H disposed thereon. In addition, housing 11 may have ribs 11R to help locate the cells 12 within housing 11. Preferably holes 11H are disposed between ribs 11R and/or the walls of housing 11.

Persons skilled in the art may recognize other alternatives to the means disclosed herein. However, all these additions and/or alterations are considered to be equivalents of the present invention.

What is claimed is:

1. A battery pack comprising:
   a housing comprising a first pair of opposing walls and a second pair of opposing walls, the second pair being transverse to the first pair;
   a plurality of cells disposed within the housing;
   at least two terminals electrically connected to the cells;
   a latching mechanism disposed on each wall of the first pair of opposing walls for latching the battery pack to a cordless device, each latching mechanism comprising a latch, and a button disposed on each wall of the first pair for moving the latch between unlatching and latching positions, the latching buttons being disposed along a first plane, the first plane being substantially vertical;
   wherein number of cells disposed along the first plane is smaller than number of cells disposed along a second plane substantially parallel to the first plane.

2. The battery pack of claim 1, further comprising a stacked cell disposed on the plurality of cells.

3. The battery pack of claim 2, wherein the stacked cell is disposed along the first plane.

4. The battery pack of claim 3, wherein the stacked cell is not included in the number of cells disposed along the first plane.

5. The battery pack of claim 1, wherein at least one wall has first and second portions.

6. The battery pack of claim 5, wherein at least one of the buttons is disposed on the second portion of the at least one of the walls.

7. The battery pack of claim 5, wherein the first and second portions comprise substantially non-coplanar surfaces.

8. The battery pack of claim 7, wherein distance between the second portion surface and a center plane dissecting the housing is smaller than distance between the first portion surface and the center plane.

9. The battery pack of claim 8, wherein the first portion surface is substantially vertical.

10. The battery pack of claim 8, wherein the second portion surface is substantially vertical.

11. The battery pack of claim 8, wherein the second portion surface is inclined.

12. The battery pack of claim 8, wherein at least one of the buttons is disposed on the second portion surface of the at least one of the walls.

13. The battery pack of claim 1, wherein the cells are vertical.

14. The battery pack of claim 1, wherein at least one of the cells is vertical.

15. The battery pack of claim 1, wherein the housing comprises a floor.

16. The battery pack of claim 15, wherein the floor is substantially horizontal.

17. The battery pack of claim 15, wherein the latching buttons are disposed along a first line located at a first distance from the floor.

18. The battery pack of claim 17, wherein distance between the latching buttons along periphery of the housing is smaller than distance between two points along periphery of the housing, the two points being contained within a second line parallel to the first line and located at the first distance from the floor.

19. A battery pack comprising:
   a housing comprising a floor, a first pair of opposing walls connected to the floor, at least one wall of said first pair having first and second portions, and a second pair of opposing walls connected the floor, the second pair of opposing walls being transverse to the first pair of opposing walls;
   a plurality of cells disposed within the housing;
   at least two terminals electrically connected to the cells;
   a latching mechanism disposed on each wall of said first pair for latching the battery pack to a cordless device, each latching mechanism comprising a latch, and a button disposed on each wall of said pair for moving the latch between unlatching and latching positions, the latching buttons being disposed along a first line located at a first distance from the floor;
   wherein distance between the latching buttons along periphery of the housing is smaller than distance between two points along periphery of the housing, the two points being contained within a second line parallel to the first line and located at the first distance from the floor and in the first portion.

20. The battery pack of claim 19, wherein the first and second portions comprise substantially non-coplanar surfaces.

21. The battery pack of claim 20, wherein distance between the second portion surface and a center plane dissecting the housing is smaller than distance between the first portion surface and the center plane.

22. The battery pack of claim 20, wherein the first portion surface is substantially vertical.

23. The battery pack of claim 20, wherein the second portion surface is substantially vertical.

24. The battery pack of claim 20, wherein the second portion surface is inclined.

25. The battery pack of claim 20, wherein at least one of the buttons is disposed on the second portion surface of the at least one of the walls.

26. The battery pack of claim 19, wherein the cells are vertical.

27. The battery pack of claim 19, wherein at least one of the cells is vertical.

28. The battery pack of claim 19, wherein number of cells disposed along a first plane between the latching buttons is smaller than number of cells disposed along a second plane substantially parallel to the first plane.

29. The battery pack of claim 28, further comprising a stacked cell disposed on the plurality of cells.

30. The battery pack of claim 29, wherein the stacked cell is disposed along the first plane.

31. The battery pack of claim 30, wherein the stacked cell is not included in the number of cells disposed along the first plane.

\* \* \* \* \*